United States Patent [19]

Marchesi

[11] Patent Number: 4,581,144
[45] Date of Patent: Apr. 8, 1986

[54] METHOD FOR TREATMENT OF IMPOUNDED MATERIAL (SLUDGES) FROM THE CHEMICAL TREATMENT OF SPENT SULFURIC ACID WITH LIME

[75] Inventor: Primo Marchesi, Lock Haven, Pa.

[73] Assignee: American Color and Chemical Corporation, Charlotte, N.C.

[21] Appl. No.: 648,847

[22] Filed: Sep. 7, 1984

[51] Int. Cl.$^4$ .............................. C02F 1/52; C02F 1/66
[52] U.S. Cl. .................................... 210/667; 210/694; 210/713; 210/724; 210/769; 210/909; 210/917
[58] Field of Search .............. 210/667, 670, 675, 694, 210/711, 713, 724, 726, 751, 769, 917, 669, 909

[56] References Cited

U.S. PATENT DOCUMENTS

| | | | |
|---|---|---|---|
| 3,640,820 | 2/1972 | Kemmer et al. | 210/711 |
| 3,772,191 | 11/1973 | Thorn | 210/724 |
| 4,005,011 | 1/1977 | Sweeny | 210/694 |
| 4,038,180 | 7/1977 | Talbert | 210/711 |
| 4,163,715 | 8/1979 | Ikari et al. | 210/719 |
| 4,221,661 | 9/1980 | Shimizu et al. | 210/724 |

FOREIGN PATENT DOCUMENTS 53-128147 11/1978 Japan .................................. 210/711

Primary Examiner—Peter Hruskoci
Attorney, Agent, or Firm—Norman N. Spain

[57] ABSTRACT

A method and apparatus for treating sludges that have resulted from chemical treatment of sulfuric acid wastes with lime are shown. The sludges are subjected to fluidization, dilution, and acidification to solubilize solids, clarification to concentrate solids for reacidification and produce a supernatant for carbon adsorption to remove organics and color, with regeneration of spent carbon including incineration of solids, and finally incineration of the spent carbon and all other remaining unsolubilized solids.

2 Claims, 1 Drawing Figure

METHOD FOR TREATMENT OF IMPOUNDED MATERIAL (SLUDGES) FROM THE CHEMICAL TREATMENT OF SPENT SULFURIC ACID WITH LIME

BACKGROUND OF THE INVENTION

1. Field of the Invention

This invention relates to a method for treating sludges that result from the chemical treatment of spent sulfuric acid with lime, and in particular to a method for solubilizing the solids, reducing color, and total organic carbon (TOC) of the treated material to a predetermined level.

2. Description of the Prior Art

It has become an increasingly critical problem to provide a method for cleaning up impounded material (sludges) that does not require land space for burial. This problem is particularly acute with industries that chemically treat spent sulfuric acid with lime, resulting in calcium sulfate settling in lagoons or impoundments.

The conventional methods for these materials are: (1) dewatering, followed by landfilling of the semi-solids, or (2) vaulting in place using slurry walls and stabilization. Both of these conventional methods result in the contamination of land making such land useless for any future productive use. Both of these methods can create groundwater contamination at some future date that could require complete removal or re-vaulting.

There has heretofore not been found possible a method to clean-up sludges that is cost effective with the conventional methods. The prior art does not teach a system to solubilize the solids (calcium sulfate) and to treat the solubilized sludge with activated carbon to reduce TOC and color to a predetermined level, and to incinerate remaining undissolved solids simultaneously with regeneration of the spent carbon, and finally to incinerate the spent carbon with all other remaining solids.

SUMMARY OF THE INVENTION

It is an object of this invention to provide an improved method for treating a semi-solid sludge formed by the neutralization of lime of a sulfuric acid effluent contaminated with environmentally significant amounts of organic solvents and by-products resulting from the production of synthetic dyes and related intermediate chemicals.

According to the invention, a novel and improved method for treating such a sludge comprises mechanical fluidization of the sludge, followed by dilution to a fresh water content of about 5–10% by weight, and then acidification with hydrochloric acid, clarification of the acidified material to concentrate solids and to produce an effluent which is passed through carbon absorption columns to reduce levels of nitrobenzene, other organics, and color to a predetermined level.

The method futher comprises recycling of the concentrated solids from the clarifier for reacidification thereby causing solubilizing of additional solids. The continuous reacidification of the recycled solids simultaneously with acidification of additional sludge reduces the initial solids content to a predetermined level. The remaining finely divided insoluble solids is then directed into a carbon regeneration furnace simultaneously with regeneration of the spent carbon. The regenerated carbon and the inert oxides from the insoluble solids are then reused in the carbon absorption column. At the completion of the treatment, the spent carbon and any remaining insolubles are incinerated in the carbon regeneration furnace.

DESCRIPTION OF THE PREFERRED EMBODIMENT

Figure 1:
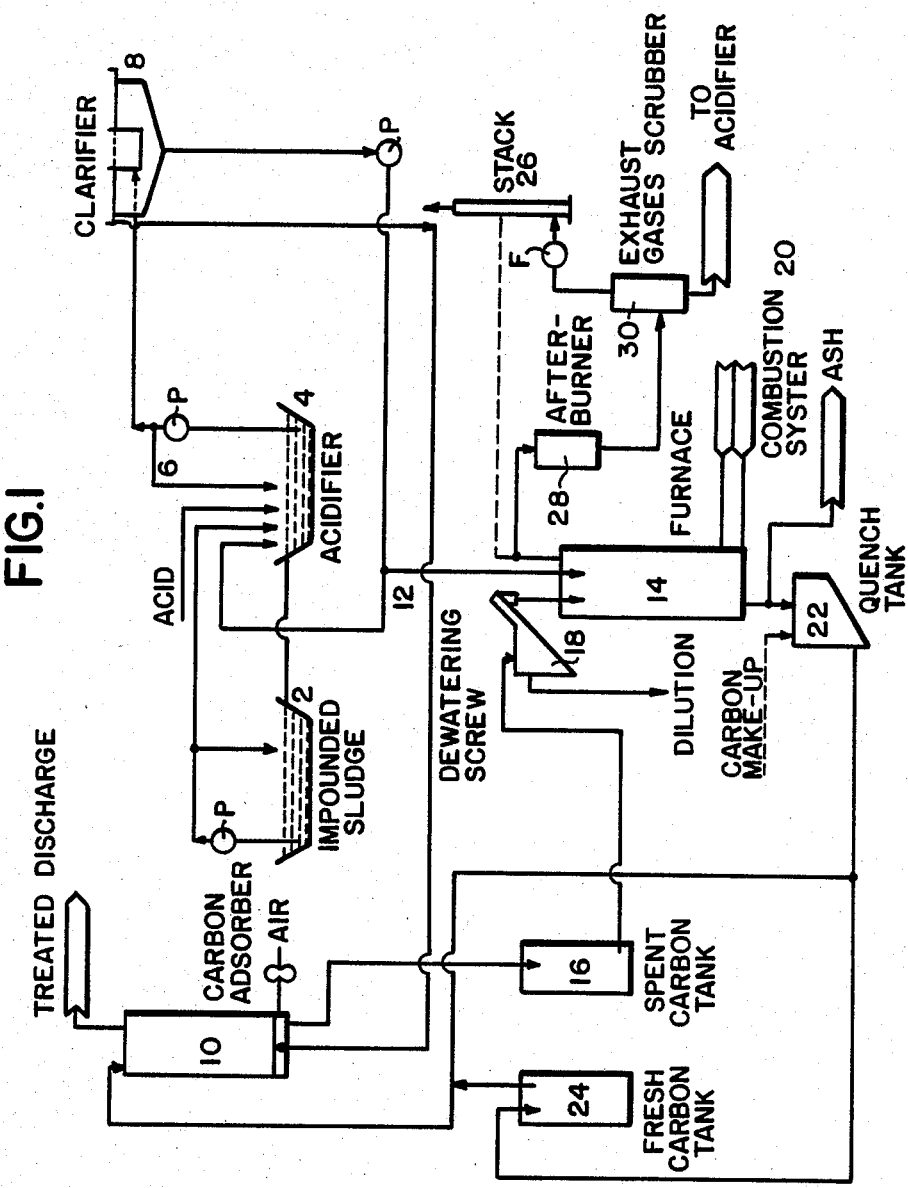
FIG. 1 is a schematic diagram illustrating the method and apparatus of the invention.

Referring to the FIGURE, impounded sludge in vessel 2 as set forth in Table 1, is mechanically fluidized insitu.

TABLE 1

| Impounded Sludge Characteristics | |
| --- | --- |
| Mass | 75,000 tons (18,750 tons of solids) |
| % Solids (Filterable) | 25TOC. . . 150 ppm |
| Nitrobenzene | 56 ppm |
| Color | 20,000 APHA units |
| Viscosity | High, like mayonnaise; after dilution, high to medium like heavy motor oil. |
| Landfilling Space | 17,400 cubic yards dewatered sludge plus 17,400 cubic yards of cement dust, total of 34,800 cubic yards space. |

In vessel 4, the sludge is subjected to minimal dilution (with water to a dilution level of about 5–10% by weight of fresh water) and then acidification with hydrochloric acid to a concentration of about 0.26–0.36 pounds of about 34% hydrochloric acid per pound of net solids. The dilution avoids serious foaming conditions. The flow of sludge from vessel 4 which is controlled by recycle 6 and flows into clarifier 8 to concentrate solids. The resultant clear effluent is taken from the clarifier 8 and transferred to carbon column 10. A portion of the concentrated solids from the clarifier 8 is returned for reacidification in vessel 4, and another portion of the concentrated solids is transferred to furnace 14 for incineration simultaneously with carbon regeneration through recycle 12.

After passing through the carbon column 10, the treated effluent is reused for dilution or discharged. After this treatment, the effluent has characteristics as set forth in Table 2.

TABLE 2

| Impounded Sludge Characteristics After Acidification | |
| --- | --- |
| Mass | 88,000 tons (1,900 tons of solids) |
| % Solids (Filterable) | .2 |
| TOC | 156 ppm |
| Nitrobenzene | 56 ppm |
| Color | 20,000 APHA units |
| Viscosity | Medium to low, like light motor oil. |

In order to improve the efficiency of treatment, it is desirable to recover the spent carbon from the carbon column 10. Spent carbon is transferred to the carbon regeneration furnace 14 by means of a dewatering screw 18. The spent carbon from the dewatering screw 18 is blended with a portion of the concentrated solids from the recycled bottoms from clarifier 8. This blend will incinerate the solids to an inert material as spent carbon is being regenerated. Fuel supply 20 provides the fuel necessary to evaporate the carbon, while incinerating the solids. Regenerated carbon from the furnace is transferred to the quench tank 22, and then to the regenerated carbon tank 24 or back to the carbon column 10. The exhaust gases from the carbon regenerating furnace 14 are released from stack 26 and are also transferred to afterburner 28. The gases from afterburner 28 are cooled in water scrubber 30 and discharged through stack 26. It is imperative to the invention that the required procedure be carried out in the proper sequence. Therefore, the fluidization and dilution must be carried out before acidification, and solids must be returned from the clarifier for reacidification and solids must be blended with spent carbon during the regeneration. The significance of this feature will result in only a few percent of solids remaining when treatment has concluded. After conclusion of treatment of the impounded sludge, all remaining spent carbon and the few percent of solids are incinerated in furnace 14 by increasing the oxygen content of the off gases. The spent carbon and solids are incinerated, leaving inert solids for disposal.

TABLE 3

| Impounded Material At Completion Of Treatment | |
|---|---|
| Mass | 88,000 tons (1,900 tons of solids for incineration reduced to 800 tons). |
| % Solids (Filterable) | .1 |
| TOC | 26 ppm |
| Nitrobenzene | 6 ppm |
| Color | 800 APHA units |
| Viscosity | Low, like water. |
| Landfilling Space Required | 800 cubic yards. |

The invention may be embodied in other specific forms without departing from the spirit or essential characteristics thereof. The present disclosed embodiments are therefore to be considered in all respects as illustrative and not restrictive, the scope of the invention being indicated by the appended claims.

What is claimed is:

1. A method of treating an impounded semi-solid sludge formed by the neutralization by lime of a sulfuric acid effluent contaminated with environmentally significant amounts of organic solvents and by-products including nitrobenzene resulting from the production of synthetic dyes and related intermediate chemicals and containing environmental significant amounts of total organic carbon and having an environmental significant color, said method comprising the steps of:
    (a) subjecting said impounded semi-solid sludge to a mechanical fluidization treatment,
    (b) diluting said fluidized sludge with water to a fresh water content of about 5–10% by weight and acidifying said diluted sludge with hydrochloric acid to a hydrochloric acid concentration of about 0.26–0.36 pounds of about 34% hydrochloric acid per pound of net solids,
    (c) clarifying the thus acidified sludge to provide a clarified effluent and solid bottoms,
    (d) subjecting the thus clarified effluent to carbon adsorption with activated carbon to remove color, nitrobenzene, and other organics from said effluent,
    (e) recycling said solid bottoms for reacidification,
    (f) blending a portion of the thus recycled solid bottoms with spent carbon from said carbon absorption step d and incinerating said blend of said recycled solid bottoms and said spent carbon.

2. The method of claim 1 wherein the spent carbon from said carbon adsorption step d is regenerated while said blend is incinerated.

* * * * *